INVENTORS.
ARTHUR W. ALPHENAAR
CLYDE W. BAXTER
GEORGE A. FRANCO
BY
F. L. Styner
ATTORNEY July 28, 1959 A. W. ALPHENAAR ET AL 2,897,269

FREQUENCY SHIFT KEYED RECEIVER

Filed Oct. 25, 1957 3 Sheets-Sheet 3

United States Patent Office 2,897,269

Patented July 28, 1959

2,897,269

FREQUENCY SHIFT KEYED RECEIVER

Arthur W. Alphenaar and Clyde W. Baxter, Rochester, and George A. Franco, Pittsford, N.Y., assignors to General Dynamics Corporation, Rochester, N.Y., a corporation of Delaware Application October 25, 1957, Serial No. 692,426

6 Claims. (Cl. 178—88)

This invention relates to telegraph receivers of the type which must receive distinctive mark and space signals that are suitably encoded to convey intelligence between a transmitting station and a receiving station.

The mark and space intervals are usually of equal length and must be synchronized at the receiver and transmitter, if machines of the type manufactured and sold under the trademark "Teletype" are to be used for transmission and read-out of messages. Separate synchronizing pulses may be transmitted to insure long-time synchronism of bauds at the two ends of the transmission.

Where a radio link is employed, the synchronizing pulses as well as the mark and space pulses, are often lost in the noise of the radio link. When the signal-to-noise ratio is unfavorable, the mark and space bauds may shift in phase at the receiver with respect to the corresponding bauds at the transmitter, and either mark or space signal may become obscured by strong noise pulses. Erroneous read-out is more damaging than total loss of signal.

Information contained in a frequency shift keyed telegraph is completely determined by the mark frequency or space frequency condition. If for all time a correct decision can be made at the receiver as to whether a mark frequency or a space frequency was transmitted, the signal can be decoded, and no additional synchronizing information need be supplied to the receiver.

An object of this invention is an improved telegraphic receiver.

A more specific object of this invention is an improved telegraphic receiver adapted for frequency shift keying.

A still more specific object of this invention is an improved telegraphic receiver in which mark signals and space signals can at all times be determined even in the absence of an accompanying synchronizing pulse.

The objects of this invention are attained by a plurality of pairs of resonant, free-running, high-Q filters, resonant respectively to the mark and space frequencies of the received signal. Signal amplitude in the several pairs of the resonators, connected in parallel to the radio receiver, are successively sampled, each resonator being quenched after each sampling. According to this invention, the sampling and quenching are at a relatively high rate with respect to the mark-space time intervals so that each mark or space signal is chopped into a series of voltages representative of the combined signal and noise voltages received during the transmission of the mark and space signals. The samplings of each pair of resonators are compared in amplitude, by subtracting one sample from the other, so that the polarity of a resultant direct current reliably identifies each mark or space signal.

Other objects and features of this invention will become apparent to those skilled in the art by referring to the specific embodiment described in the following specification and shown in the accompanying drawing in which.

This invention recognizes and utilizes, in a novel manner, the characteristic of a free-running resonant circuit to gradually build up in amplitude the voltage of an applied resonant frequency, the rate of build up being dependent largely upon the Q, or ratio of reactance to resistance, of the circuit. Fortunately, the rate of amplitude build-up for noise voltages of random frequency components is less than the rate of build-up of signal voltage having a clearly dominant frequency component. The circuits of this invention take advantage of this difference of build-up rate in a resonant circuit.

Figure 1:
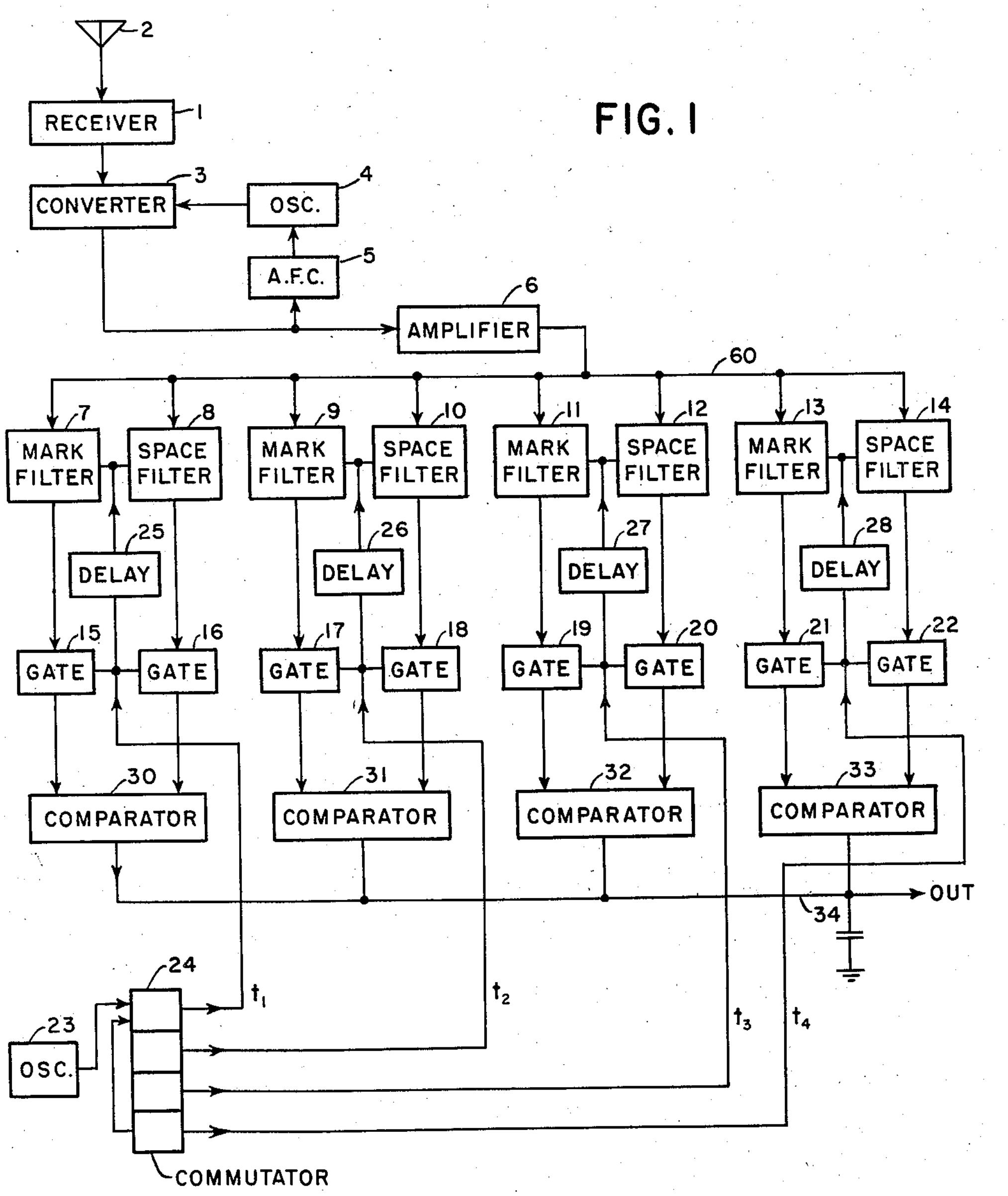
Figure 1 is a block diagram of one teletype receiver of this invention.

Figure 1 shows, in block diagram, one receiver system embodying this invention. The transmitting media for the telegraphic signals may be any of the well known types including wire lines, submarine or coaxial cables, or radio. In the illustrated example, the radio receiver 1 with an antenna 2, is shown for receiving a carrier wave modulated with the telegraphic signals. The telegraphic signals comprise two frequencies to which arbitrarily has been assigned the names "mark" and "space" frequencies. Typically, the modulated carrier is first heterodyned in the receiver to any desired intermediate frequency, from which can be extracted the mark and space frequencies. For this purpose, the converter 3 may be used with the local oscillator 4 and automatic frequency control 5. The two frequencies are fed into the broad band multicoupler amplifier 6 of sufficient band width to not discriminate against either frequency. All frequencies including mark, space, and noise are passed by the amplifier 6, and are applied to the filters indicated by references 7 to 14, inclusive. The inputs to the filters are arranged in parallel and the odd numbered filters are sharply resonant to the "mark" frequencies, while the even numbered filters are sharply resonant to the "space" frequencies. The mark and space frequencies should be sufficiently separated to insure reliable discrimination by the particular filters chosen. Mark and space frequencies of 600 to 1200 cycles per second could be used, for example. Whatever the carrier frequency may be, the local oscillator should preferably be adjusted to yield an easy-to-amplify intermediate frequency of, say, 455 kilocycles per second.

The filters may be of any type, preferably having high-Q characteristics. The desired high-Q characteristics may be obtained, for example, by high gain resonant amplifiers or by amplifiers having resonant regenerative feedback circuits. Alternatively, crystal filters may be used. For example, commercially obtainable HYCon Model 22 crystal filters have a 3db bandwidth of 45 c.p.s. centered at 100 kilocycles and, hence, have a natural Q of 2,220. Regenerative resonant amplifiers commonly have Q's of 5000.

The output of each filter must pass through a gate, the gates being indicated in Figure 1 by reference numerals 15 to 22. Even-numbered gates are connected in the output of the even numbered space filters, while the odd-numbered gates are connected in the output circuits of the odd-numbered mark filters. The gate circuitry may be of any conventional design which can be biased closed so that normally the output signal of the filters cannot pass. However, the gates are momentarily opened by gating pulses. The gating pulse is preferably quite short compared to the duty cycle of the gating pulse generator for reasons which will presently appear. For example, a gating pulse of one millisecond may be used in a system designed to be pulsed at the rate of 45.45 pulses per second. The one millisecond gating pulse thus provides at the output of the gate a useful sample of the resonant voltage in the filter at the instant of the pulse.

The gating pulses are obtained from generator 23, the gating pulses being applied successively to each pair of gates 15—16, 17—18, 19—20, and 21—22, at time $t_1$, $t_2$, $t_3$, and $t_4$, by means of commutator 24. The time intervals betwen successive pulses are preferably equal. According to this invention, the gating pulses, controlled by the generator 23, need not necessarily be related in frequency to the baud frequency of the signals to be received. The sequence of successive gating pulses for the four gate pairs, in this example, may be obtained from a number of conventional commutator circuits. A four-stage ring type mulivibrator, for example, or four bistable flip-flops cascaded in a circle. An output is taken from each flip-flop, and applied to one of the gate pairs. The commutator is shown in block diagram at 24 to represent the four outputs, and the single input. If the pulse duration is adjusted to 1 millisecond, the pulse interval should be about 22 milliseconds in a system intended to receive 60 words per minute, representing an average baud frequency of 43 per second.

According an an important feature of this invention, the oscillations in the filters are completely quenched immediately after the filter voltages are sampled by the 1 millisecond gate. Conveniently, the quenching voltages are obtained from the gating pulses. For example, each quenching pulse can be made to accurately follow its gating pulse by initiating the quenching pulse by the trailing edge of the gating pulse. By differentiating the decaying side of the gate pulse, ample quenching voltage can be generated. Alternatively, the gate pulses can be delayed, as in delay circuits 25, 26, 27 and 28, and applied to the filters. The required duration and amplitude of the quenching pulse depends, of course, upon the parameters of the filter circuits to be used. In the system illustrated where the filters are of the conventional high-Q LC type having a Q of about 5,000, the duration of the quenching pulse should be about one milliescond for complete quenching maximum oscillator volatage in the filter.

The sample voltages at the output of each pair of gates are compared in comparators 30, 31, 32 and 33, respectively. By simply subtracting one gated voltage from the other, the noise components, which are common to the mark and space filters of the gated pair, are balanced out in the comparator. However, the mark frequency voltage is compared with the space frequency voltage and the comparator output voltage is always positive or negative with respect to ground, and always reliably distinguishes between the two received frequencies. The output voltages of the comparators are all applied to the common output bus 34 and, hence, to the print-out machine, not shown.

Figure 2:
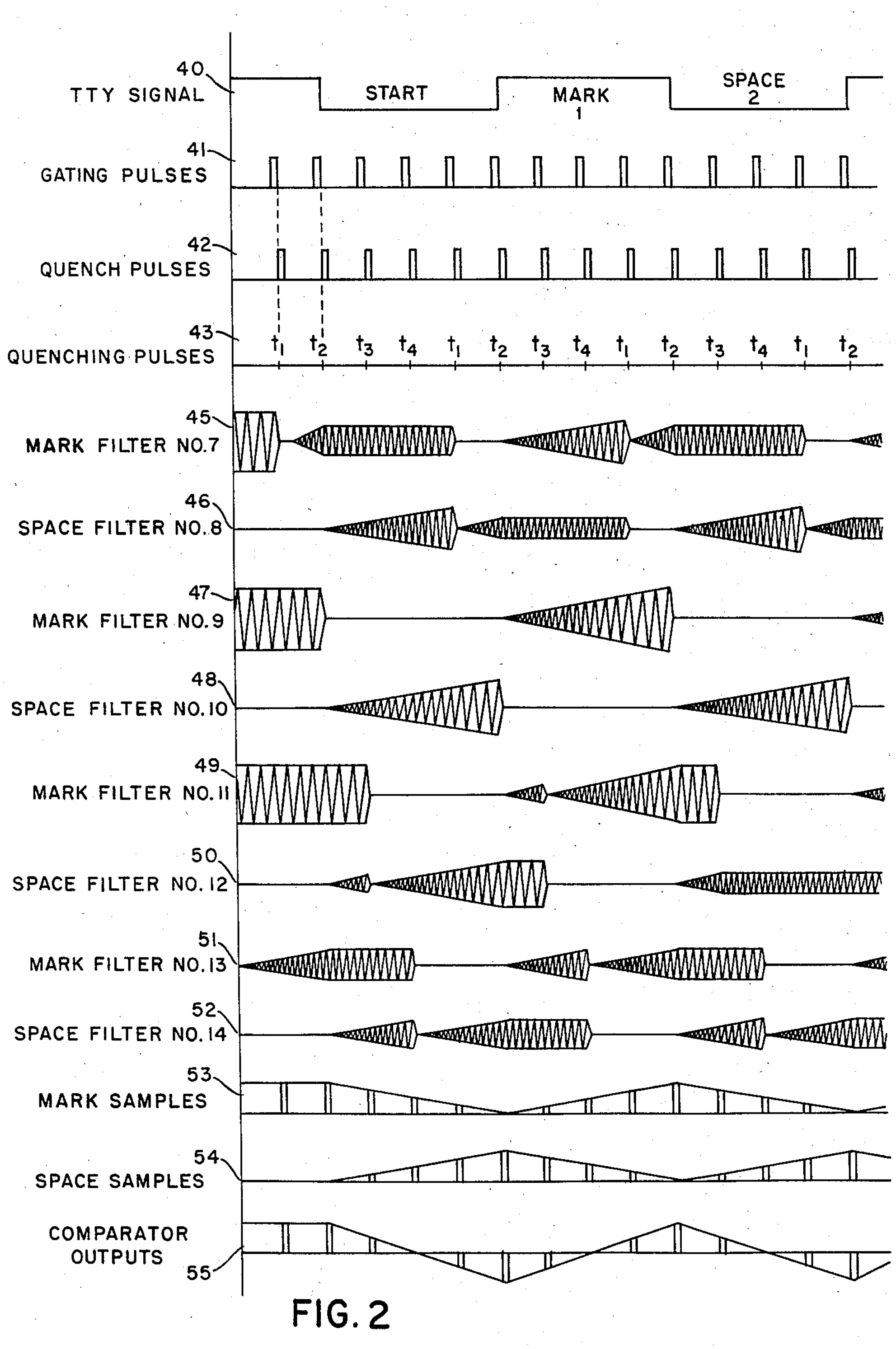
Figure 2 is a time chart showing the phase relation of important voltages in the system of Figure 1.

The operation of the system of Figure 1 can best be understood by referring to the time diagram, in Figure 2, of important voltages in the system. At 40 is shown a mark-space symbol of a teletype signal to be received by the receiver of this invention. For convenience only, the mark and space portions of the teletype signal are represented by two distinct amplitudes although differences in amplitude of the mark and space signals as transmitted need not be a characteristic of the signal. Actually, the mark and space portions are usually effected by two distinct frequencies modulated upon a carrier by phase or frequency type modulations. At 41 is shown the sequence of gating pulses from the generator 23, which pulses are followed slightly in time by the quenching pulses at 42. The pulse frequency is shown at 43 and in the particular example shown the pulse frequency is four times the baud frequency, the pulses occurring at instances of time $t_1$, $t_2$, $t_3$, and $t_4$. On lines 45, 47, 49, and 51 are shown, respectively, the amplitudes of the oscillatory voltage in the odd numbered mark filters for the particular telegraph signal at 40 with the quenching and gradual oscillation build-up clearly shown. Likewise, on lines 46, 48, 50, and 52 are shown the oscillatory voltages in the even numbered space filters. At the instant of the application of a quench pulse to any filter, the oscillatory voltage in the filter is reduced to zero during a negligible time period, whereup the amplitude of oscillation immediately commences to build up when a signal voltage of resonant frequency is applied to the filter. In the diagram of Figure 2, no noise voltage is assumed for convenience of analyzing the diagrams. The build-up rate of noise oscillations is, as stated above, slower than that of the mark and space frequencies.

It is to be noted that the quenching pulses is applied to any one gate only once during each baud and that in the assumed noiseless condition the oscillation amplitude starts only when the appropriate mark or space frequency is applied. The summation of the mark samples shown on line 53 and the summation of the space samples shown on line 54 are subtracted one from the other and the resultant of the comparator outputs is as shown on line 55. It is to be noted that the positive-negative decisions made by the system is predicated upon the comparative values of the mark and space bauds and not upon their quantitive values with respect to any reference voltage plane or ground.

If random noise is superimposed upon the voltages diagrammed at 45 to 52, the mark-space differences at 55 will remain essentially unchanged.

Figure 3:
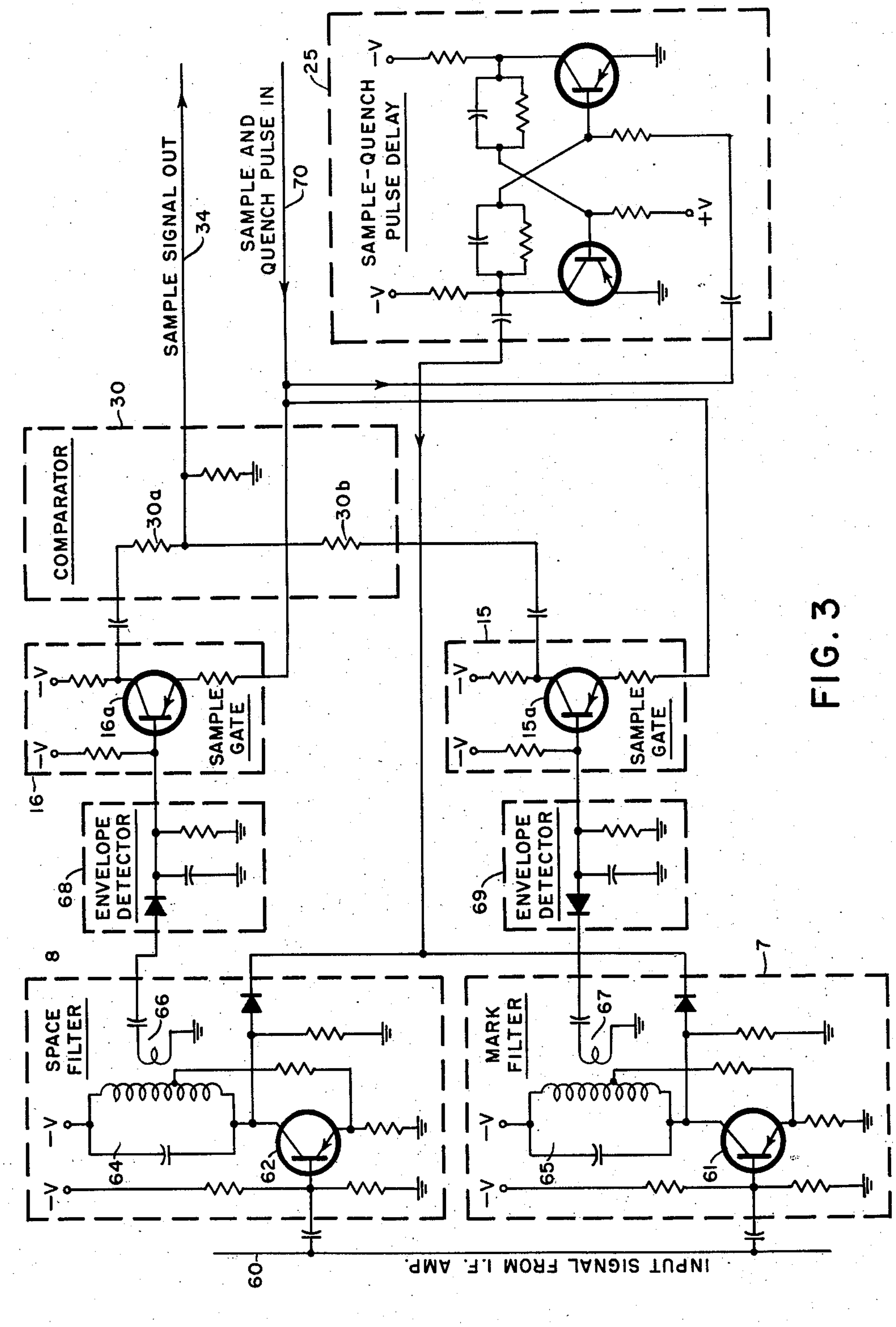
Figure 3 shows one specific configuration for the system shown in block diagram in Figure 1.

In Figure 3 is shown one specific circuit configuration for a simple pair of mark-space filters that may be used for the system shown in block diagram in Figure 1. In Figure 3 the mark-space signals received from amplifier 6 are applied to line 60 and, hence, to the bases of several transistors in the several mark-space filters. Transistors 61 and 62 are shown, although vacuum tubes could be used. In the collector circuit of each transistor is a free-running resonant circuit, such as the tank circuits 64 and 65, inductively coupled to coils 66 and 67, in turn capacitively coupled to and through detectors 68 and 69 to sampling gates 15 and 16. Here again transistors are effectively used.

The sampling and quenching pulses from the oscillator-commutator 23, 24 are introduced on line 70 and are applied in parallel to the emitters of transistors 15*a* and 16*a* in the example shown of the transistors in gate 15 and 16. The voltage sources and polarities are so chosen that transistors 15*a* and 16*a* are normally nonconducting between their bases and respective collectors while the emitters are standing normally negative. Upon receipt of a positive-going pulse the two transistors 15*a* and 16*a* become conductive, permitting the detected signals of 68 and 69 to pass to the adding resistors 30*a* and 30*b*. Depending upon relative amplitudes of the two oppositely polarized voltages, the output bus 34 reliably indicates the mark or space of the signal.

The same sample pulse is presented to a monostable multivibrator network 25, the output of 25 being employed to ground and quench the energy stored in resonant tank circuits 64, 65 of space and mark filter 7 and 8.

Alternate means for delaying the sample pulse to produce the quenching pulse immediately after the sampling may be employed. For example, the sampling pulse on line 70 could be differentiated in an ordinary series condenser-parallel resistor-type of differentiator and then applied to the lower ends of the tank circuits 64 and 65 as shown. That is, a simple differentiating circuit could be directly substituted for the multivibrator 25.

The telegraphic receiver of this invention can at all times determine the mark signals and the space signals even in the absence of an accompanying synchronizing pulse from the transmitter. Many modifications can be made in the specific circuits shown without departing from the scope of the invention as defined in the following claims.

What is claimed is:

1. In combination in a receiver, a source of telegraphic signals of distinctive mark and space frequencies, a plurality of pairs of resonant circuits coupled to the source of said signals, the Q of said resonant circuits being relatively high, one resonant circuit of each pair being resonant to the mark frequency and the other resonant circuit of each pair being resonant to the space frequency; said resonant circuits being free-running so that applied frequencies cause progressively higher oscillatory voltages; pulse means connected to said resonant circuits for quenching said voltages, the quenching pulses being successively applied to said pairs of resonant circuits; a gate in the output of each resonant circuit, control circuits for the gates, said control circuits being synchronized with the mentioned quenching pulses.

2. In combination in a receiver, a source of telegraphic signals of distinctive mark and space frequencies, a plurality of pairs of filters coupled in parallel to said source, one filter of each pair being resonant to the mark frequency and the other filter of each pair being resonant to the space frequency, means for periodically and successively sampling the amplitude of oscillations in said pairs of filters, and means for periodically and successively quenching the oscillations in said pairs of filters.

3. In combination in a telegraph receiver, a plurality of pairs of filters coupled in parallel to a common signal source; the filters of each pair being resonant, respectively, to a mark frequency and a space frequency; means for successively sampling the voltages in the resonant circuits of each pair of filters, means for successively quenching oscillations in the filters of each pair, means for comparing the sampled voltages of the filters of each pair, and means for combining the compared voltages.

4. In a telegraph receiver system for a composite signal containing noise components and two distinctive mark and space frequencies distributed in time and encoded with message intelligence, said system containing means for reliably identifying each of the two frequencies comprising two groups of free-running resonant circuits resonant, respectively, to said two frequencies, means for continuously applying said composite signal to said resonant circuits, means for periodically and successively quenching oscillations in said resonant circuits, the period of quenching being shorter than mark or space duration, and means for sampling and comparing the amplitude of oscillations in the two groups of resonant circuits, the sampling in each circuit being made only during the approximate maximum of oscillation.

5. A receiver for distinguishing a signal of known frequency in an unfavorable noise background comprising a circuit resonant at said known frequency, means for continuously applying the signal and noise frequencies to the resonant circuit, means for periodically quenching all oscillations in said circuit, and means for measuring the amplitude of oscillations in said circuit prior to each quench.

6. Means for detecting a frequency shift keying signal of predetermined frequency in a noise background comprising a resonant circuit, means for continuously applying the signal to said resonant circuit; means for periodically sampling the amplitude of oscillator voltage in said circuit, and means for periodically quenching oscillations in said circuit, the sampling and quenching rate being higher than the signal keying rate.

References Cited in the file of this patent

UNITED STATES PATENTS

| | | |
|---|---|---|
| 2,644,036 | Jones | June 30, 1953 |
| 2,676,203 | Phelps | Apr. 20, 1954 |
| 2,844,309 | Ayres | July 22, 1958 |